Nov. 25, 1941.                G. USMAR                    2,263,862
                    INSULATED REFRIGERATING BOX
                      Filed Sept. 10, 1940          4 Sheets-Sheet 3
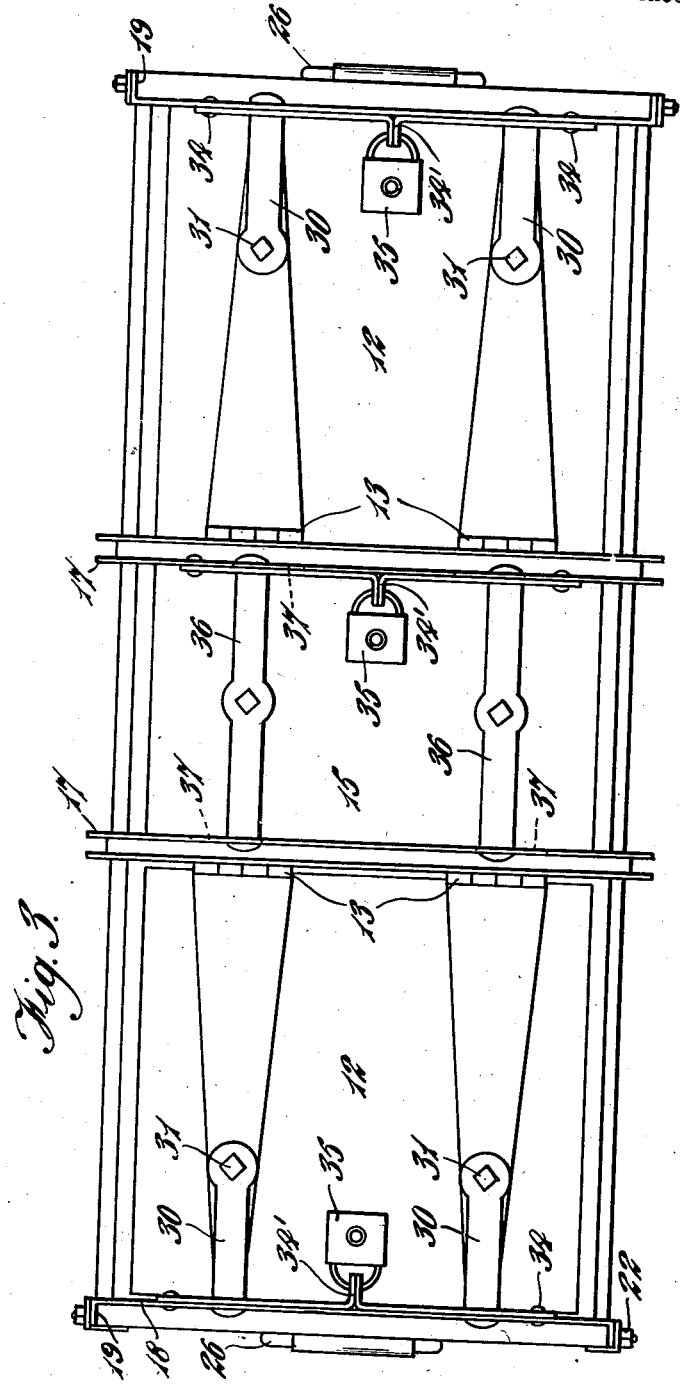
INVENTOR
Gordon Usmar,
BY Wolhaupter & Groff
ATTORNEYS Nov. 25, 1941.　　　　G. USMAR　　　　2,263,862
INSULATED REFRIGERATING BOX
Filed Sept. 10, 1940　　　4 Sheets-Sheet 4

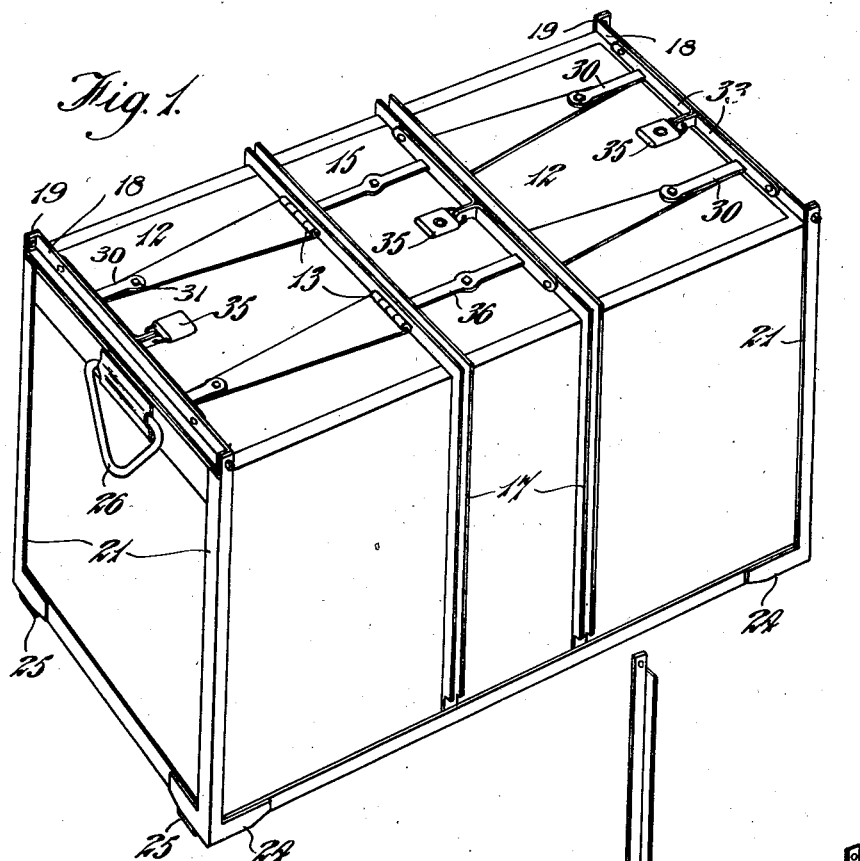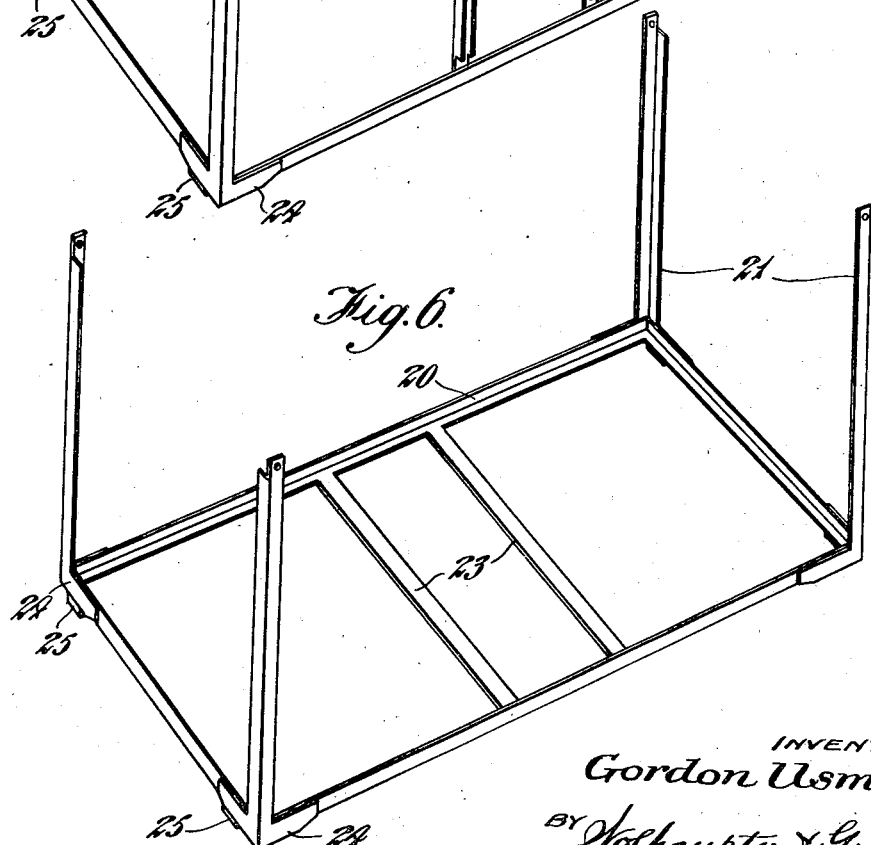

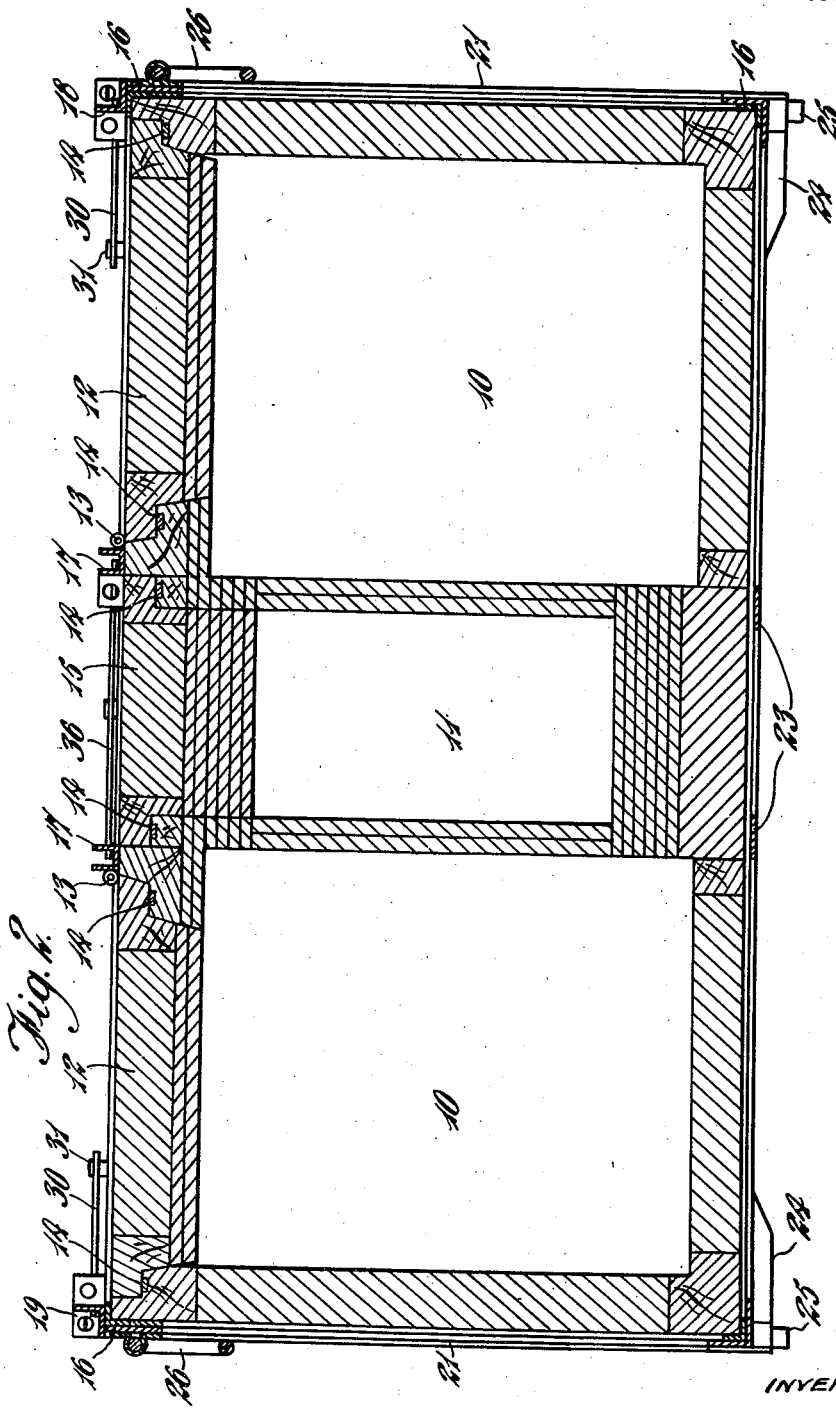

INVENTOR
Gordon Usmar,
BY Wolhaupter & Groff
ATTORNEYS

Patented Nov. 25, 1941

2,263,862

UNITED STATES PATENT OFFICE 2,263,862

INSULATED REFRIGERATING BOX

Gordon Usmar, Effingham, England

Application September 10, 1940, Serial No. 356,229
In Great Britain November 18, 1938

2 Claims. (Cl. 220—12)

This invention relates to improvements in insulating refrigerating boxes and has for its chief object to provide a simple and cheap, while at the same time, efficient construction of the same which will withstand the rough handling to which such devices are subjected in transit.

The insulated refrigerating box according to the present invention comprises a pair of food containing or like containing compartments between which is arranged a chamber to contain the cooling agent, the whole being enclosed within a metal framework or cradle which adequately protects the corners of the device, the said cradle being removably attached to the refrigerating box.

Several other novel and advantageous features of construction and arrangements are provided by the present invention, these being fully described hereinafter and claimed in the appended claims.

In order that this invention may be the more clearly understood and readily carried into effect, I will proceed to describe the same with reference to the accompanying drawings, which illustrate by way of example one convenient embodiment of this invention, and in which:

Figure 1 is a perspective view of the complete refrigerating box closed, and

Figure 2 is a central vertical section through the same.

Figure 3 is a plan view of the box, and

Figure 6 is a perspective view of the reinforcing framework or cradle.

Figure 4:
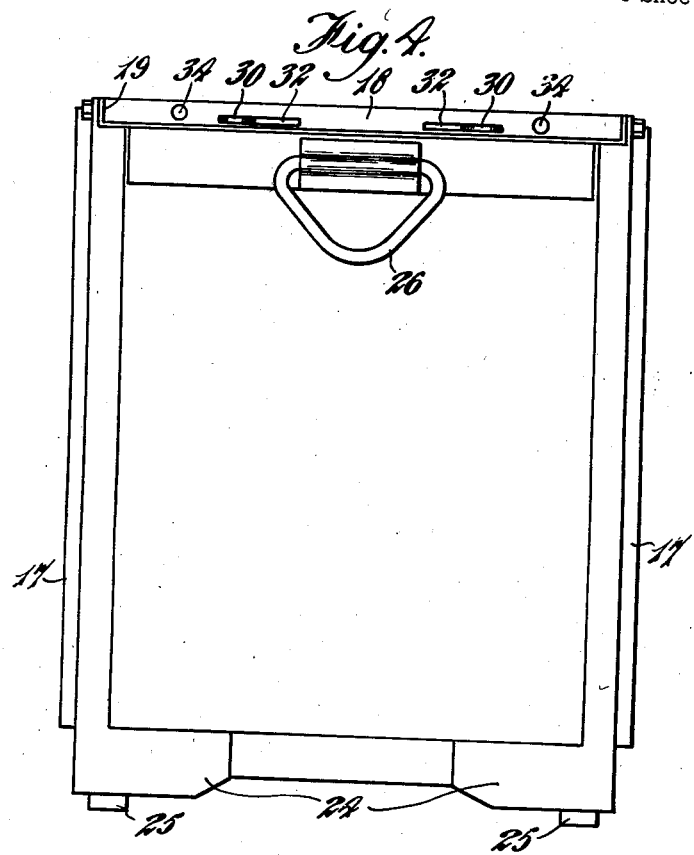
Figure 4 is an end view of the same.
Figure 5:
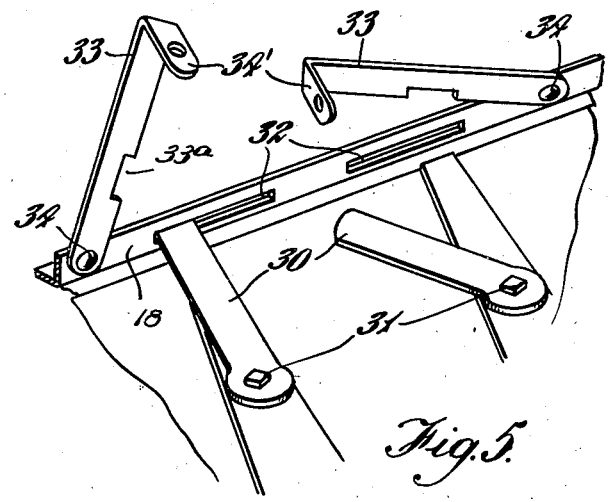
Figure 5 is a detail view illustrating the means for locking the food containers, and showing the locking means open.

Referring now to the drawings, the insulated refrigerating box therein illustrated comprises two food or like receiving compartments 10 between which is disposed a chamber 11 adapted to receive the refrigerating agent such as solid carbon dioxide or the like. The compartments 10 are heat insulated in any manner which is usual in this art, the general arrangement of such insulated refrigerating boxes being already known. The food or like compartments 10 are provided with stepped and heat insulating lids 12 hinged at 13 to the main body of the box, suitable rubber or like packing seals 14 being provided to prevent the leakage of heat. The cooling agent chamber 11 is also provided with a stepped and heat insulated lid 15 which is not hinged but is mounted as hereinafter described.

In accordance with the present invention, the refrigerating box is provided with external metal reinforcements, these comprising angle strips 16 disposed around all the edges of the box, intermediate channel section reinforcements 17 disposed at or near the division between the compartments 10 and the chamber 11, and also angle iron reinforcing strips 18 fixed along the ends of the box, on the top edges thereof with the legs of said angle iron strips extending outwardly substantially parallel to the top and end faces of said box, the vertical webs of these reinforcing strips 18 being turned outwardly as at 19 for a purpose hereinafter described.

The reinforced box thus provided is, in accordance with the preferred embodiments of the present invention, housed within a skeleton framework or cradle 20 (the shape of which is shown more clearly in Figure 6), the upper ends of the vertical parts 21 of this cradle being adapted to be bolted to the lugs 19 by means of the bolts 22. The cradle is thus detachable from the refrigerated box when desired.

The cradle is made mainly of angle steel and, in addition to transverse metal strip stiffeners 23, is provided with reinforced lower corners 24 having downwardly projecting lugs or feet 25. These feet 25 are so positioned that when the boxes are stacked one on top of the other they become located in the corners of the angle irons 18 and so hold the boxes firmly on one another and prevent movement.

Carrying handles 26 are also mounted on the cradle by means of mounting strips 26' in the embodiment shown in the drawings, these carrying handles being replaced, in the larger types of boxes, with lifting rings and retractable wheels for easy handling and stacking.

Suitable means of appropriate form are provided for locking and/or sealing, for customs purposes, the lids of the compartments 10 and the chamber 11. Convenient means of locking these lids are shown, by way of example only, in the drawings, it being clearly understood that any other appropriate locking means may be provided without departing from the scope of the present invention.

In the case of the lids 12 of the compartments 10, the hinges are extended across the top of the lid and are provided at their ends with arms 30 pivoted at 31 thereon. These arms 30, when the lid is to be locked, are adapted to swing into line with the hinges, in which position they pass into slots 32 in the angle irons 18. Locking is effected by means of a pair of arms 33 pivoted at 34 to the angle irons 18 and provided on their under edge with recesses 33a to take about the arms 30, these arms 33 being provided with out-turned ends 34' through which a padlock 35 or an appropriate seal is passed. It will be seen that until the arms 33 are raised it will be impossible to free the arms 30 and to raise the lids 12.

Similar means are also conveniently provided for locking the removable lid 15 of the chamber 11, the arms 36 in this case, however, being pivoted in the centre of the lid 15 and taking into slots 37 in both of the reinforcing members 17. Like locking arms 33 and padlock 35 are provided on one of the reinforcing members 17 to lock these arms 36.

It forms one of the advantageous features of the present invention that the cooling agent chamber 11 is quite independent of the food or like compartments 10 and the same may be recharged and inspected without in any way interfering with the food or like compartments 10.

The whole device according to the present invention is simple and comparatively cheap to construct, is very robust and, furthermore, will be found to be very efficient.

I claim:

1. In a portable refrigerating cabinet, a rectangular box having a pair of compartments at its respective ends and adapted for normal positioning in a horizontal position, refrigerating means for cooling said compartments, a pair of right angular structural reenforcing members respectively attached to the opposite top edges of said ends of said box and having their legs respectively extending outwardly therefrom substantially parallel to the top and end faces thereof, the terminal portions of the vertical web of said angular members being bent substantially at right angles to the central portion of said vertical web and across the horizontal web thereof, a pair of doors for respectively closing the tops of said compartments and being hinged at the inner edge thereof which is parallel to and remote from the respective top edges of the ends of said box, for swinging movement into and out of engagement with the top edges of the respective ends of said box which carry said angular members, the central portion of the vertical web of each said angular member being provided with a pair of spaced longitudinal slots, a pair of locking fingers pivotally mounted on the top of each of said doors and swingable into and out of engagement with said slots respectively, and a pair of locking arms pivotally mounted on the vertical web of each of said angular members, and provided on their lower edges with recesses engageable respectively with said fingers in their position of engagement with said slots for locking the same in said engaged position, each said arm being provided with a terminal hasp portion, which hasp portions are mutually engageable when said arms are swung into position to lock said fingers in the position of engagement with said slots.

2. In a portable refrigerating cabinet, a rectangular box having a pair of compartments at its respective ends and adapted for normal positioning in a horizontal position, refrigerating means for cooling said compartments, a pair of right angular structural reenforcing members respectively attached to the opposite top edges of said ends of said box and having their legs respectively extending outwardly therefrom substantially parallel to the top and end faces thereof, the terminal portions of the vertical web of said angular members being bent substantially at right angles to the central portion of said vertical web and across the horizontal web thereof, said bent terminal portions of said web being respectively centrally apertured, and a supporting cradle for said box comprising a closed rectangular frame and four up-standing legs projecting from the four corners of said frame perpendicularly thereto, the ends of said up-standing legs being apertured, said cradle being adapted to receive said box with its bottom face resting on said rectangular frame and said upstanding legs engaging the vertical edges of said box with the apertures in said up-standing legs in register with the apertures in said bent terminal portions of said angular members for receiving locking bolts passing therethrough, right-angled corner pieces provided respectively on the lower face of said rectangular frame at the corners thereof and opposite said up-standing legs, said right-angled corner pieces being positioned on said cradle with their mutually perpendicular edges respectively in vertical alignment with the central and terminal bent portions of the vertical web of said angular member, whereby a plurality of said boxes, each in its own cradle, may be stacked with said corner pieces of the cradle of one box respectively lockingly engaging said vent terminal portions of said angular members of the box beneath.

GORDON USMAR.